Feb. 19, 1946.    C. H. SAUER    2,395,072
BRAKE SYSTEM
Filed April 13, 1943    5 Sheets-Sheet 1

INVENTOR.
CHRISTIAN H. SAUER
BY Boykin, Mohler & Backley
ATTORNEYS.

Feb. 19, 1946. C. H. SAUER 2,395,072
BRAKE SYSTEM
Filed April 13, 1943 5 Sheets-Sheet 2

INVENTOR.
CHRISTIAN H. SAUER
BY
Boyken, Mohler & Beckley
ATTORNEYS.

Feb. 19, 1946. C. H. SAUER 2,395,072
BRAKE SYSTEM
Filed April 13, 1943 5 Sheets-Sheet 3

INVENTOR.
CHRISTIAN H. SAUER
BY
*Burton, Mohler & Beckley*
ATTORNEYS.

Feb. 19, 1946.   C. H. SAUER   2,395,072
BRAKE SYSTEM
Filed April 13, 1943   5 Sheets-Sheet 4
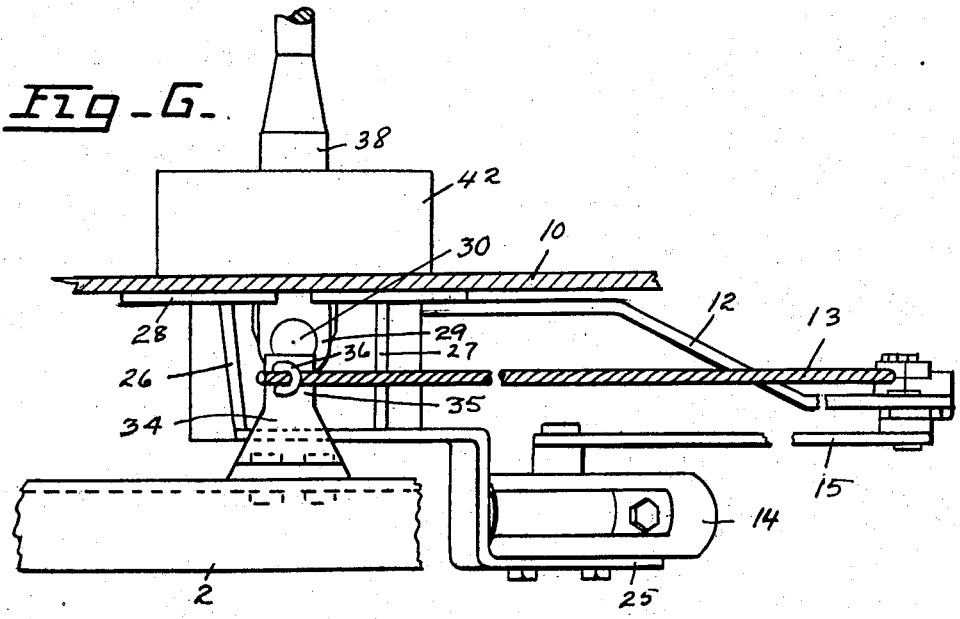
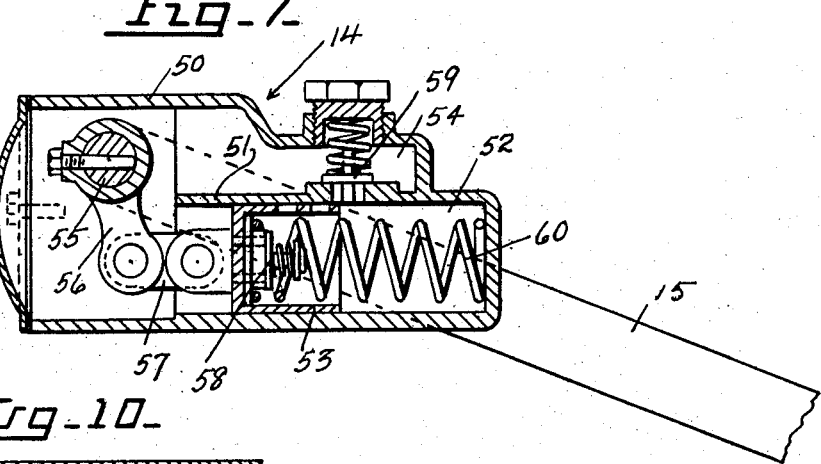
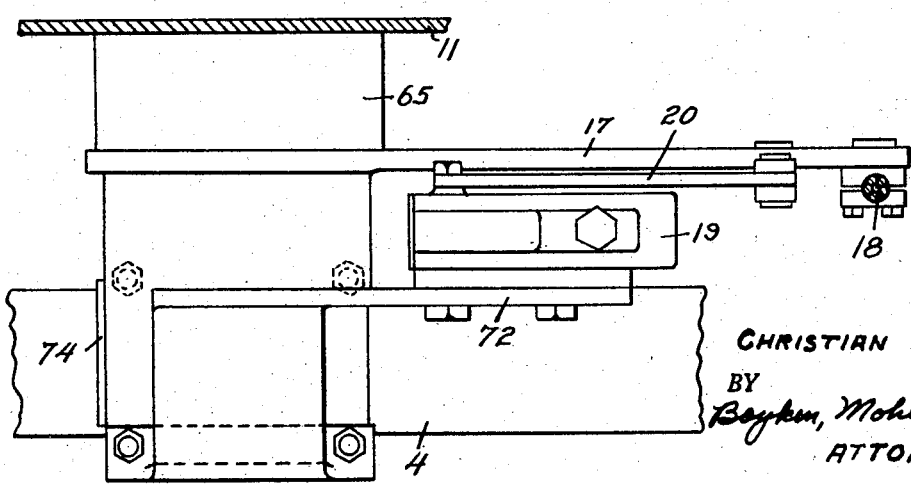
INVENTOR.
CHRISTIAN H. SAUER
BY
Boyken, Mohler & Beckley
ATTORNEYS.

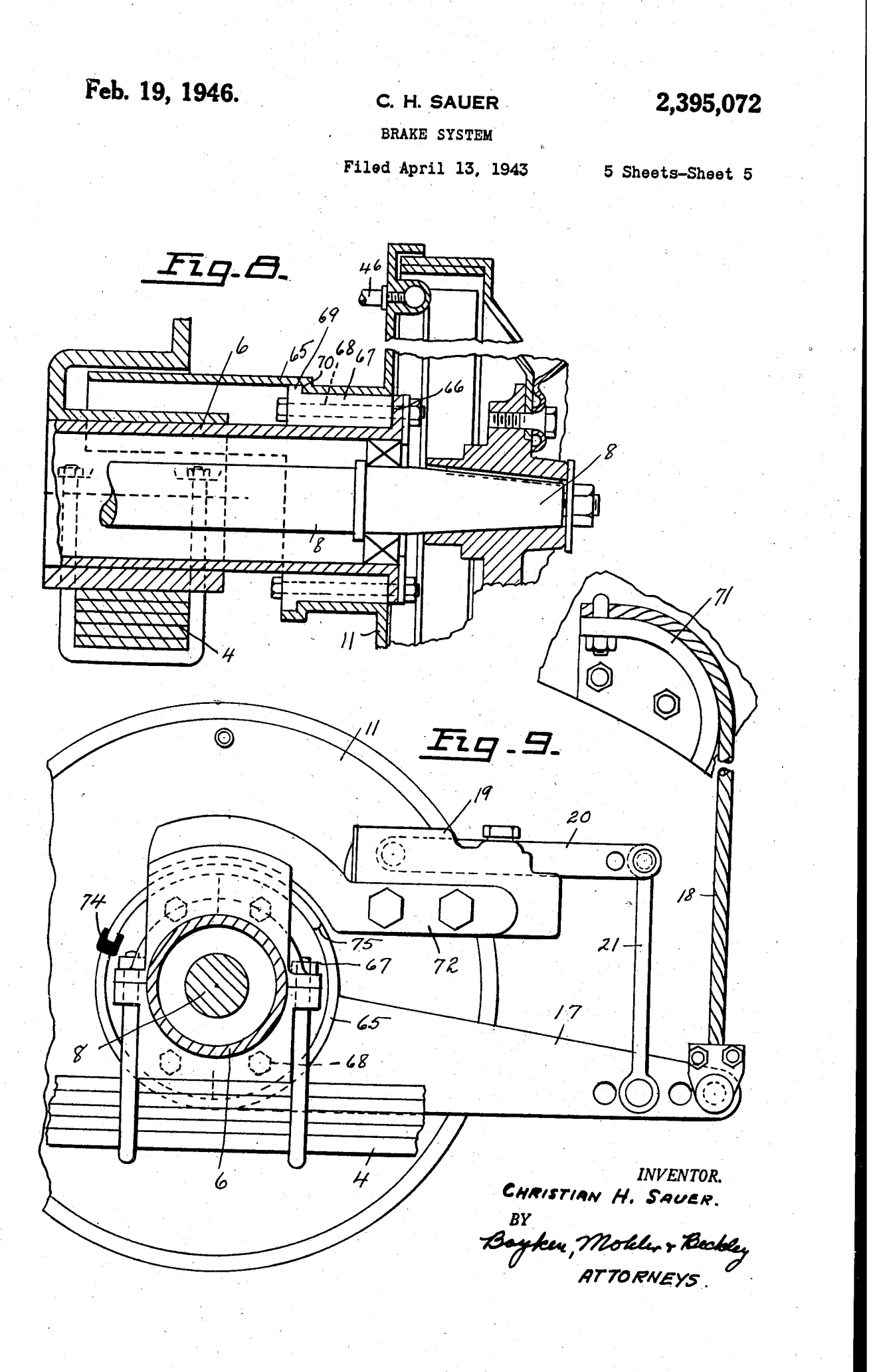

Feb. 19, 1946.   C. H. SAUER   2,395,072
BRAKE SYSTEM
Filed April 13, 1943   5 Sheets—Sheet 5

INVENTOR.
CHRISTIAN H. SAUER.
BY
Boyken, Mohler & Beckley
ATTORNEYS.

Patented Feb. 19, 1946

2,395,072

UNITED STATES PATENT OFFICE 2,395,072

BRAKE SYSTEM

Christian H. Sauer, Chico, Calif., assignor to J. T. Alm, Chico, Calif.

Application April 13, 1943, Serial No. 482,851

20 Claims. (Cl. 188—2)

This invention relates to an improved brake system and stabilizer in wheel mounted vehicles.

One of the objects of this invention is the provision of a connection between the brakes of a vehicle and the body or frame carried by the wheels that functions to substantially reduce the swaying and bouncing of the body laterally and vertically both before and after the brakes are applied, and which connection also cooperates with the wheels and body to transmit the braking force to the wheels and ground in a manner that eliminates skidding of the wheels or tires on the ground and also eliminates the tendency of the vehicle to swerve when the brakes are applied with great force while the vehicle is traveling at any rate of speed.

Another object of the invention is the provision of connections between the brake and body of a vehicle that includes shock control elements that function to reduce road shocks that would normally be transmitted through the wheels, springs, steering gear, etc., to the body while also contributing to the efficiency of the brakes when the latter are applied.

A still further object of the invention is the provision of a brake and shock absorber system in a vehicle, which system is associated with the body and all of the braking wheels for cooperating with each other and with the body to stabilize the body at all times during operating of the vehicle, and which system includes elements connected with the shock absorbing elements that facilitate the action of the brakes when the latter are applied and released.

Other objects and advantages will appear in the description and drawings annexed hereto.

The present system is an improvement of the invention disclosed in my co-pending application, Serial No. 453,501, filed August 4, 1942, entitled "Brake system." In the present system, I employ connections between the brakes and body of the vehicle that are disposed substantially within the laterally projected areas of the respective wheels, and the backing plate of each braking wheel is rotatable to degrees proportional to the frictional resistance between the brake shoes and drum thereof, all of which is disclosed in said co-pending application.

While the drawings only illustrate an embodiment of the invention relative to the left front and rear wheels of a four-wheeled vehicle, such as an automobile, it is to be understood that the two front wheel arrangements are alike and the two rear wheel arrangements are the same. The front wheel elements function exactly the same, and the rear wheel elements function alike. The detailed description hereinafter made will be directed to only one front wheel and to one rear wheel, and applies to the other front wheel and to the other rear wheel.

In the drawings,

Fig. 6 is a reduced size part sectional part plan view of the portion of the invention as shown in Fig. 2.

Fig. 7 is a vertical sectional view through one of the shock absorbers used.

Fig. 8 is a sectional view of part of one of the rear wheel devices, the axle being shown in elevation.

Fig. 9 is a sectional view of one of the rear wheel assemblies taken transversely of the rear axle.

Fig. 10 is a part plan view and part sectional view of the assembly of Fig. 9.

In the detailed description of the drawings, it is to be understood that the elements of the invention employed with respect to each of the front wheels is identical, and the elements employed with respect to each of the rear wheels is also identical.

In Figs. 2, 3 to 6 the left front wheel assembly, insofar as this invention is concerned, is illustrated, while in Figs. 8, 9, 13 the left rear wheel assembly is illustrated. The right front wheel assembly would be like that of the left front wheel, and the right rear wheel assembly would be like that of the left rear wheel.

Figure 1:
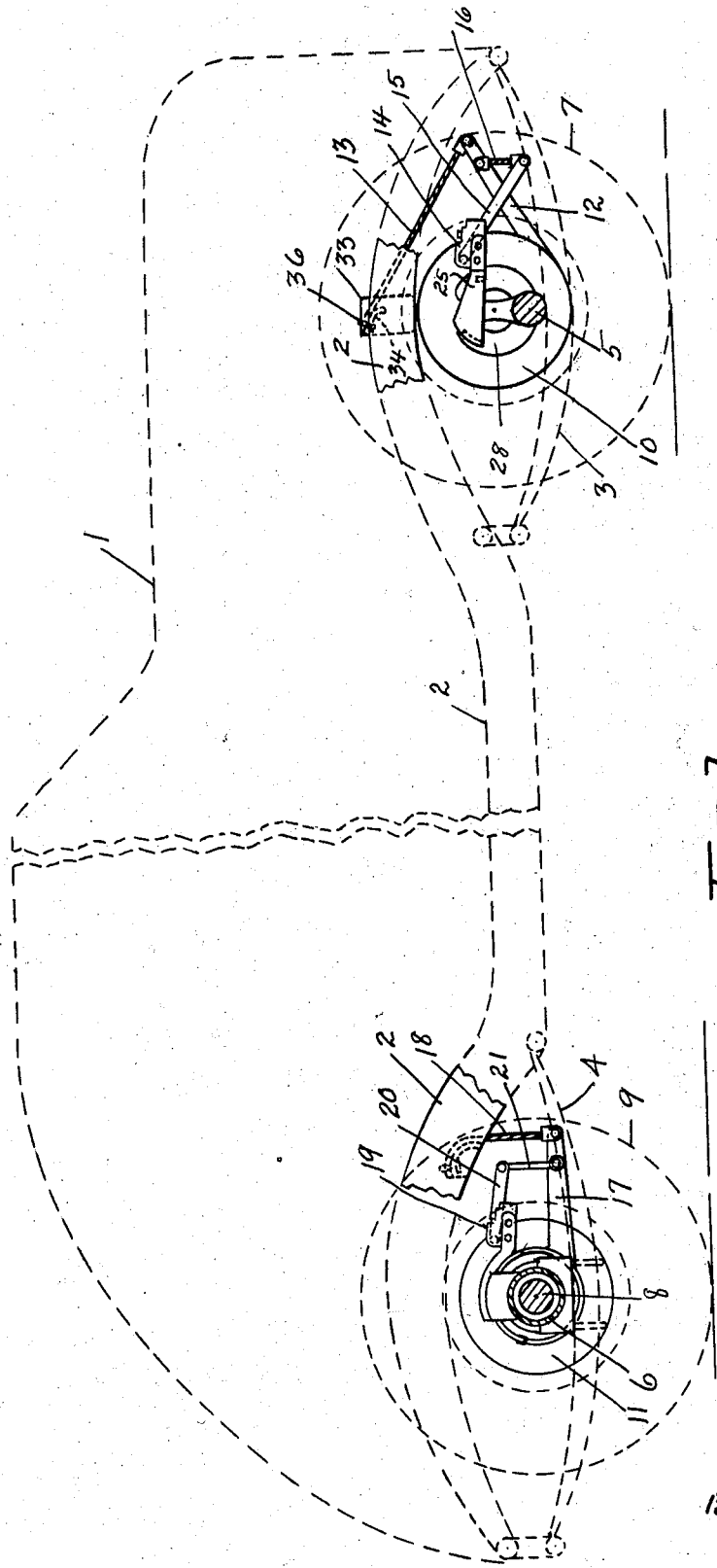
Fig. 1 is a semi-diagrammatic view of an automobile illustrating in full line the positions of the various elements as they are applied to each of the rear and front wheels. The body, frame and springs are indicated in dotted line, these being conventional.

In detail in dotted line in Fig. 1 is indicated the body 1 of a four-wheeled vehicle supported rigidly on a chassis or frame having side frame members 2, and which frame is in turn supported on conventional front and rear semi-elliptical springs 3, 4 that are respectively secured to front axle 5 and to the rear axle housing 6. The front axle has the conventional steering knuckles and spindles supporting front wheels 7 while axles 8 concentric in housing 6 carry rear wheels 9. All of these elements are conventional in automobiles.

Each of the front wheels includes a backing plate 10 that carries the conventional brake shoes, while each of the rear wheels also carries a backing plate 11 that has the brake shoes secured thereto.

Projecting generally forwardly from backing plate 10 of each front wheel is an arm 12. A flexible cable 13 is pivotally secured at one end to the forward outer end of each arm 12 and the opposite end of each cable is secured to the side frame member 2 that is above each arm 12, at a point substantially on a line in upward extension of the conventional king pin bolt that pivotally supports each front wheel.

Carried rigid with each front axle and at the inner side of each front wheel is a shock absorber device 14 having an arm 15 projecting generally forwardly therefrom. The end of said arm that is connected to the device 14 is operatively connected with a spring that constantly tends to swing the forward or outer end of the arm downwardly, while a fluid or liquid in the device functions to check and retard upward movement of the said outer end of the arm, as will be described more in detail later on.

One end of a flexible connector, such as a cable 16, is pivotally secured to the outer end of arm 15 and the other end of said cable 16 is pivotally connected to the outer end of arm 12.

The backing plate 10 of each front wheel is rotatable relative to the front wheel and brake drum, as will be described later on.

Referring now to the rear wheel assembly, each backing plate 11 is rotatable relative to the axle housing 6 and carries a forwardly projecting arm 17 rigid therewith. A flexible cable 18 is pivotally secured at one end to the forward outer end of each arm 17, while the opposite end of each cable 18 is secured to the side frame member 2 thereover. Cables 18 extend generally vertically as distinguished from the cables 13 that are associated with the front wheels.

Rigidly secured to the rear axle housing against rotation relative thereto is a pair of shock absorber devices 19, one being adjacent each rear wheel. Each of these devices is like the devices 14 already described, and each carries an arm 20, the outer forward end of which is spring urged downwardly at all times by a spring in the device 19 while upward movement of the arm 20 is checked and retarded by fluid or oil in the device. The forward outer end of each arm 20 is connected by a rod 21 with the arm 17 that is adjacent thereto by pivots at the ends of said rod.

Cable 16 of each front wheel assembly is arranged to pull downwardly on each arm 12 that is adjacent thereto since the connection between each cable and the downwardly urged arm 15 is below the arm 12, while the rod 21 of each rear wheel assembly is connected at one end thereof to downwardly urged arm 20 above the arm 17 which results in the arm 20 exerting a downward push on arm 17 through rigid rod 21.

The provision of cables 13, 18 connecting arms 12, 17 with side frame members 2 enables the arms 12, 17 to swing upwardly when the vehicle is moving in reverse and the brakes are applied, although this upward movement of the arms is checked or retarded to a substantial degree by the fluid in the shock absorber devices 14, 19, but the springs in said devices will immediately restore the cables to taut condition when the brakes are released.

Upon application of the brakes when the vehicle is moving forwardly the arms 12, 17 will be moved downwardly free from resistance of fluid in the shock absorber devices and the energy or force built up in the revolving wheels will be transmitted directly to the side frame members 2 or the body of the vehicle, tending to pull the frame downwardly against the resistance of springs 3, 4. There will be an actual downward movement of the rear end of the body under this pull on cables 18 proportional to the speed of the vehicle and the force with which the brakes are applied since cables 18 extend almost vertically, while cables 13 at the front end of the vehicle will function more as stabilizers preventing an up and down swinging of the forward end as now occurs, although here again, there will be a downward pull on cables 13 that is proportional to the speed of the vehicle and the force with which the brakes are applied, and an actual "squatting" action of the body and frame will occur, front and back, when an abnormally fast and hard application of the brakes is made while the vehicle is moving at a sufficient rate of speed, but there is no bouncing movement of the body and frame as the force or energy transmitted to the latter through the cables prevents its occurrence.

Where the vehicle is moving forwardly at a normal traveling rate of speed and any wheel passes over a sharply defined hollow, or past a sharply defined ridge or bump, the downward movement of such wheel is restricted by the shock absorber devices that are carried by the axles, although there is no such restriction against upward movement of the wheels relative to the frame. Thus in striking a sharply defined bump or ridge the normal vehicle springs will absorb the shock as they are intended to do, but the force thus accumulated, as it were, in the springs resulting in their compression and through them transmitted in a degree to the frame and tending sharply to drop the wheels to normal ground level through the expansion force of the springs, will be restricted by the shock absorber devices. This substantially eliminates the rebound of the body that heretofore has occurred by reason of relatively free expansion of the springs after the striking of bumps by the wheels and when the springs would normally be under least load supporting tension. By more nearly maintaining the springs under their normal load supporting tension after their compression and when their tension would normally be released to the minimum of resistance to downward movement of the body, the body will move along a relatively straight line irrespective of the irregularities in the contour of the surface of the road.

Also, the arrangement of elements hereinbefore described will substantially eliminate side sway since the expansion of the springs on one side or the other is restricted by the shock absorber devices, and road shocks through the front wheels to the steering wheel are reduced to a negligible degree.

The connecting of one of the ends of cables 13 to the side frame members 2 at a point on the axis of each king pin permits turning of the front wheels free from any distortion or strain on the elements of this invention while maintaining their efficiency for accomplishing their desired results, and the flexibility of cables 13, 18 is very important in permitting rotation of the backing plates in either direction while the shock absorber elements maintain the cables taut immediately upon a release of the brakes.

Figure 2:
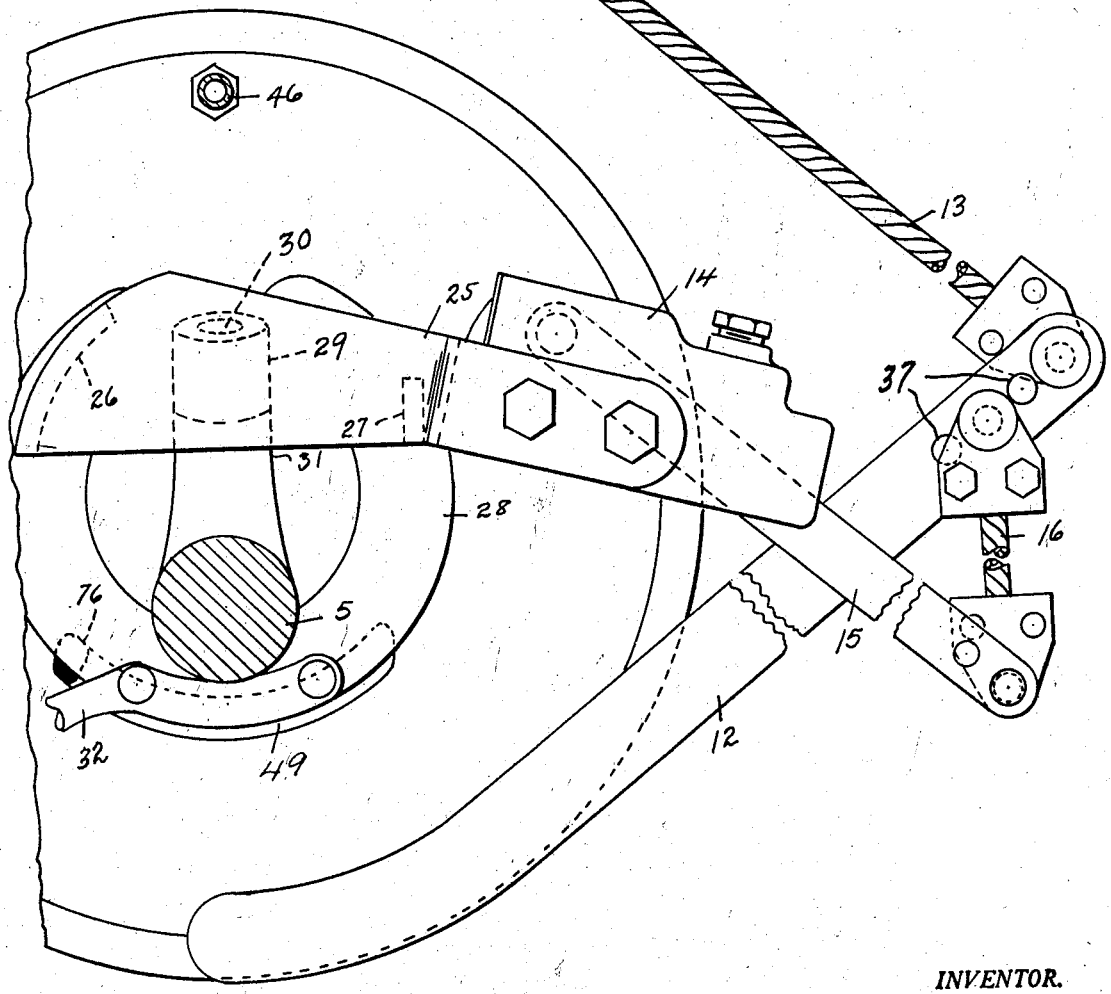
Fig. 2 is an enlarged fragmentary part elevational and part sectional view of a portion of a front wheel of a vehicle as seen from line 2—2 of Fig. 3. Some of the elongated elements are broken in length to accommodate the view to the sheet.

In Fig. 2 the shock absorber element 14 is shown as secured rigidly to plate-like arm 25 that has a pair of webs 26, 27 projecting laterally therefrom, and which webs are secured at their outer edges, as by welding, to a special plate 28 that is rigidly secured to the portion of the steering knuckle that carries the wheel spindle. The webs are at opposite sides of the conventional portion 29 of the spindle and through which portion the king pin 30 extends. This is merely to provide a secure support for the arm 25 and the shock absorber element 14.

Figure 3:
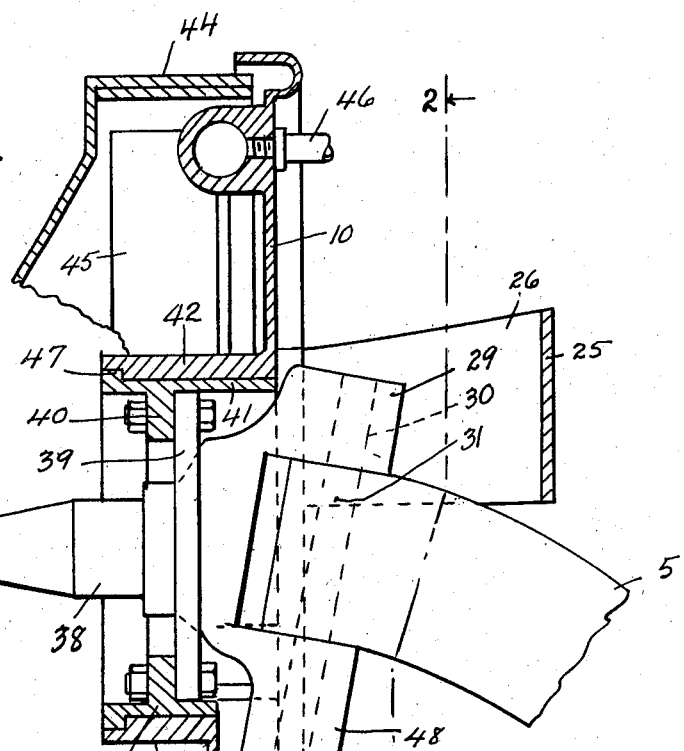
Fig. 3 is a part sectional part elevational view showing a special bearing sleeve in section and the position of the steering knuckle and king pin relative thereto, the latter being in elevation.
Figure 4:
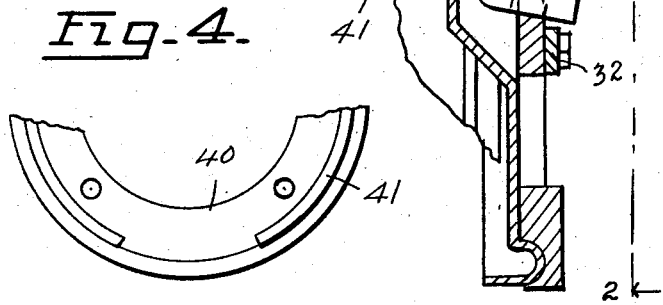
Fig. 4 is a fragmentary elevational view of the lower portion of the special sleeve shown in section in Fig. 3.
Figure 5:
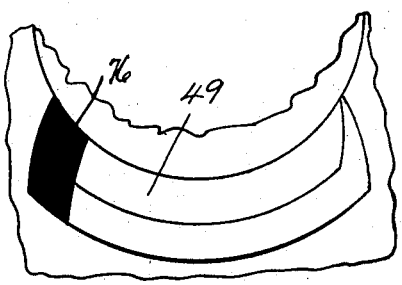
Fig. 5 is a fragmentary elevational view of the lower portion of the backing plate of Fig. 3.

The front axle of the vehicle is conventional and is rigid with end portions 31 that carry the king pins, said end portions 31 extending upwardly from the main axle to between said portion 29 of the spindle and a similar lower portion (Fig. 3). A conventional steering arm 32 is connected with the inner end of the spindle structure (Fig. 2).

Arm 12 may be welded or otherwise rigidly secured to the backing plate of each front wheel, preferably near the periphery thereof.

The upper end of each cable 13 is preferably secured to each side frame member 2 by a special plate 33, which plate may be bolted or welded to said member. A projection 34 extends laterally from plate 33, and the end of the cable 13 extends over this projection, the latter having a convexly curved upper surface 35 over which the cable rides when the arm 12 is revolved downwardly upon rotation of the backing plate. A U-bolt 36 secures the end of cable 13 to said projection at a point above said curved surface. Thus no detrimental strain is placed on cable 13 when the brakes are applied as the cable will follow the curved upper surface of the projection in its bending action adjacent bolt 36.

It is important to note that the point of engagement between cable 13 and projection 34 at all times when a strain is on said cable, is at a point substantially on a line coincident with the axis of the king bolt 30. Thus when the front wheels are turned and the outer end of arm 12 is swung in an arc, there is no change in the operation of the brake or in the steering, or in the operation of the shock absorber element.

The arms 12, 15 may be longer or shorter, as desired, and one or more extra openings 37 in the end of each arm 12, or one or more similar openings in the end of each arm 15 may be provided as indicated for varying the positions of the pivoted ends of cables 13, 16.

Each spindle 38 is provided with an annular disk 39 that is bolted at spaced points adjacent its periphery to an annular inwardly projecting flange 40 (Fig. 3) of a tubular sleeve 41.

The backing plate 10 has a tubular bearing sleeve 42 that is coaxial with sleeve 41 and rotatable thereon.

The sleeves 41, 42 project into the brake drum 44 to which the wheel is secured, and brake shoes 45 are carried by backing plate in the usual manner for hydraulic actuation through the fitting 46.

The sleeve 42 is rabbeted at one edge for receiving a complementarily formed flange 47 on sleeve 41 to prevent axial sliding of the sleeves in one direction and a portion of sleeve 41 (Fig. 4) is cut away to provide for the downwardly projecting portion 48 at the inner end of spindle 38 that corresponds to portion 29 thereof, while the backing plate 10 is formed with a recess 49 (Fig. 5) to accommodate the portion 48.

The shock absorber device 14 (Fig. 7) is identical in structure with the device 19 that is associated with each rear wheel. Each of these devices is old in itself. Each device comprises a housing 50 having a partition 51 that separates a lower piston chamber 52 having a piston 53 reciprocable therein from the upper oil chamber 54.

One end of the housing at one end of partition 51 is journalled for a shaft 55 to which arm 15 or arm 20 (Fig. 1) as the case may be, is secured. Inside the end of the housing an arm 56 (Fig. 7) is secured at one end to shaft 55, and the opposite end of arm 56 is pivotally connected with piston 53 through means of a link 57.

The piston head is apertured with a check valve 58 closing said aperture when piston 53 is moved toward the outer end of the chamber 53, and a check valve 59 over an opening in partition 51 at the outer end of the chamber 52 permits oil in the chamber to pass through said opening into oil chamber 54 but closes the opening against a return of the oil. A coil spring 60 in the chamber 52 yieldably holds the piston in the end of said chamber adjacent the shaft 55.

When arm 15 (Fig. 7) or 19 (Fig. 1) is moved downwardly by reason of downward movement of arm 12 or arm 17 (Fig. 1), there is no resistance to such movement since the spring tends to move the arm 15 or 19 in the same direction, but a force applied to said arms tending to quickly move them upwardly will close valve 58 in the piston head and the oil in chamber 52 is forced through the restricted opening normally closed by valve 29 and into chamber 54 for return past the end of the partition to the side of the piston head that is adjacent link 57.

The entire housing 50 is, of course, filled with oil or any desired fluid. As already stated, the shock absorbed devices 14, 19 are not new in themselves, and are merely illustrative of any similar device functioning in generally the same way.

Each backing plate 11 of each rear wheel brake assembly has a tubular sleeve 65 secured thereto which sleeve is coaxial with the axle housing 6. The end of the housing 6 adjacent each wheel extends into said sleeve and has a radially outwardly projecting flange 66. Between sleeve 65 and the housing 6, and around the latter is a tubular slit bearing 67 bolted to flange 66 by bolts 68. The outer end of the bearing 67 has a rather slight, radially outwardly projecting flange 69 that fits against a shoulder 70 formed in sleeve 65. Thus the backing plate and sleeve 65 will be held between flanges 66 and 69 against axial movement while the backing plate and its sleeve 65 are rotatable relative to housing 6 and bearing 67.

The reason for splitting bearing 67 is to facilitate the assembly of the bearing on the housing 6 and within sleeve 65.

The rear wheel is keyed or secured to the rear axle 8 for rotation therewith under the power from the engine, and the backing plate 11 carries the brake shoes for hydraulic actuation thereof into engagement with the conventional brake drum that is carried by the wheel, all as described in my co-pending application. There is nothing novel in the brake shoe and brake drum structure, but the separation of the backing plate from the axle housing for rotation relative to the latter is a feature of this invention in association with the other elements to be described.

The arm 17 is secured in any suitable manner, as by welding, to the sleeve 65, and the cable 18 that extends generally vertically between the outer end of arm 17 and side frame member 2 holds the backing plate against rotation with the wheel when the latter is rotating forwardly upon forward movement of the vehicle.

The upper end of cable extends over the convexly curved forward and upwardly facing surface of a plate 71 (Fig. 9) that is secured to the side frame member 2. This curvature of plate 71 prevents objectionable flexing of the cable as the outer end of arm 17 is moved downwardly upon engagement between the conventional brake shoes that are carried by backing plate 11 and the brake drum.

There may be an arm 72 secured rigidly to the axle housing 6 above arm 17 and extending forwardly from the axle housing for carrying the shock absorber element 19. This element 19 is the same as the element 14 (Fig. 7) and the arm 20 of element 19 corresponds in its action to arm 15 of element 14.

The outer end of arm 20 is connected with arm 17 by rod 21 that is pivotally secured at its ends to arm 20 and 17.

Upon application of the rear brakes the cable 18 is pulled downwardly, thus exerting a downward pull on the vehicle frame and as the spring 60 in the shock absorber element (Fig. 7) tends to push the outer end of arm 20 downwardly, there is no resistance in the shock absorber element to said downward movement. However, the upward movement of arm 17 is checked or restricted by the oil in the shock absorber device, so that a release of the brakes will not permit a rapid expansion of the previously compressed springs 4.

Upon reverse movement of the vehicle and an application of the brakes, this same restriction to upward movement of the arm 17 on each backing plate occurs, and while the arm 17 may slowly revolve upwardly, it cannot move rapidly. As soon as the brakes are released the spring 60 restores the cable 15 to its normal taut position.

Each sleeve 65 on the backing plate 11 may extend at its outer end (remote from plate 11) over spring 4 that is adjacent thereto, the lower portion of the sleeve at said end being cut away to permit its doing so. In Fig. 9 the rear edge of the portion extending over spring 4 may carry a rubber block 74 and the forward edge 75 of said portion is spaced sufficiently from the spring to permit as much downward movement of arm 17 as is required to effect the required braking action under all conditions. Thus rubber block 74 may engage the spring or spring clamp to stop rearward rotation of sleeve 65 in the event of prolonged application of the brakes when the vehicle is in reverse, while a possible accidental breakage of arm 17 or cable 18 will merely result in the spring 4 or spring clamp stopping rotation of the sleeve 65 during forward movement of the vehicle.

It is pertinent to note that on the front wheels, a rubber block 76 in one end of recess 49 in the backing plate constitutes a stop that will engage the lower portion 48 of the spindle extension upon reverse movement of the vehicle and upon application of the brakes, while the forward rotation of the backing plate in the event of breakage of the cable 13 or arm 12 due to accident, will be stopped by the same portion 48 striking the opposite end of the recess 49.

The positioning of the connections between cables 13, 18 and arms 12, 17 respectively, has a considerable bearing on the results accomplished, and these connections as well as the points of connection between the cables and side frame members 2 should be approximately within the laterally projected areas of the front and rear wheels respectively. Any substantial spacing of these connections to points outside such area substantially nullifies the purpose of the invention. The cables are not primarily to prevent torque movement but are power transmitting connections for doing work, and to do the necessary work they must be properly positioned relative to the axes of the wheels.

Prior to installation of the invention herein disclosed, and with conventional braking and shock absorber systems, a vehicle will swerve, skid, sway and have an objectionable up and down movement when the vehicle is traveling at relatively high speed and the brakes are applied for making a quick stop. The results derived from the application of this invention are many fold. Even on wet streets or on gravel covered pavement, it is practically impossible to make the vehicle skid or swerve upon sudden, strong application of the brakes when the vehicle is traveling at high speed, and in normal travel or rough roads with the brakes free, there is a marked smoothing down of the up and down movement of the body. Swaying of the body is substantially eliminated, as when the vehicle is suddenly tilted due to movement over an inclined surface transversely of the incline or when the vehicle makes a turn at high speed.

Another very noticeable result is the very material reduction in wear on the brake drum linings and brake shoes. Repeated severe applications of the brakes over long periods of time show very little wear on the linings and shoes whereas prior to the installation of this invention and with conventional structure the same severe usage for the same time requires repeated relining of the drums and shoes. This is believed to be due to the fact that a much shorter time is required to effect the desired braking action and the fact that the brake shoes move with the drums during the initial application of the brakes. There may be other factors not fully determined as yet that contribute to the beneficial results obtained.

Having described my invention, I claim:

1. In a vehicle, a frame, a rotatable ground wheel on said frame, a brake drum rigid with said wheel for rotation therewith, a brake support rotatable relative to said drum carrying friction means anchored thereto adapted to engage said drum, a yieldable connection between said support and said frame for yieldably resisting rotation of said support in a direction opposite to the direction of rotation of said wheel when said vehicle is moving forwardly, and a link secured at one end thereof to said support at a point forwardly of the axis of rotation of the latter and secured at its opposite end to said frame at a point within the lateral confines of said wheel for limiting rotation of said support in the same direction as the said direction of rotation of said wheel.

2. In a vehicle, a frame, a rotatable ground wheel on said frame, a brake drum rigid with said wheel for rotation therewith, a brake support rotatable relative to said drum carrying friction means anchored thereto adapted to engage said drum, a yieldable connection between said support and said frame for yieldably resisting rotation of said support in a direction opposite to the direction of rotation of said wheel when said vehicle is moving forwardly, and a flexible link secured at one end thereof to said support at a point forwardly of the axis of rotation of the latter, and secured at its opposite end to said frame at a point spaced thereabove for limiting rotation of said support in the same direction as the said direction of rotation of said wheel, said link being adapted to flex upon reverse rotation of said wheel.

3. In a vehicle, a frame, a rotatable ground wheel on said frame, a brake drum rigid with said wheel for rotation therewith, a brake support rotatable relative to said drum carrying friction means anchored thereto adapted to engage said drum, a yieldable connection between said support and said frame for yieldably resisting rotation of said support in a direction opposite to the direction of rotation of said wheel when said vehicle is moving forwardly, said yieldable connection including a spring yieldably urging said support for rotation on its axis of rotation in the said direction of rotation of said wheel, and a flexible connection between said support and said frame for limiting said rotation of said support in the said direction of rotation of said wheel.

4. In a vehicle, a frame, a resiliently suspended axle, a rotatable brake support mounted on said axle, a rotary brake drum, friction means anchoring on said support and adapted to engage said drum, a generally vertically extending flexible link secured at its ends to said frame and to said support and adapted to generally vertically transmit the braking torque of said support to said frame, means connected with said link for yieldably holding said link taut when said friction means is out of engagement with said drum.

5. In a vehicle, a frame, a resiliently suspended axle, a rotatable brake support mounted on said axle, a rotary brake drum, friction means anchoring on said support and adapted to engage said drum, a generally vertically extending flexible link secured at its ends to said frame and to said support and adapted to generally vertically transmit the braking torque of said support to said frame, means connected with said link for yieldably holding said link taut when said friction means is out of engagement with said drum, and hydraulic means connected with said support for resisting rotation thereof in a direction the reverse of that in which said link is held taut in torque transmitting position.

6. In a vehicle, a frame, an axle below said frame and carried by the latter, a ground wheel, a steering knuckle carrying said ground wheel and rotatable about a generally vertical axis adjacent said wheel, a rotatable brake support on said knuckle, a brake drum on said wheel rotatable therewith, friction means anchoring on said support and adapted to engage said drum, a flexible link secured at one end thereof to said frame at a point over said knuckle and on the axis of rotation of said knuckle and secured at its opposite end to said support at a point spaced laterally from the axis of rotation of the latter.

7. In a vehicle, a frame, an axle below said frame and carried by the latter, a ground wheel, a steering knuckle carrying said ground wheel and rotatable about a generally vertical axis adjacent said wheel, a rotatable brake support on said knuckle, a brake drum on said wheel rotatable therewith, friction means anchoring on said support and adapted to engage said drum, a flexible link secured at one end thereof to said frame at a point over said knuckle and on the axis of rotation of said knuckle and secured at its opposite end to said support at a point spaced laterally from the axis of rotation of the latter, said link being adapted to transmit the braking torque of said support to said frame, and means connected with said link for yieldably holding said link taut when said friction means is out of engagement with said drum.

8. In a vehicle, a frame, an axle below said frame and carried by the latter, a ground wheel, a steering knuckle carrying said ground wheel and rotatable about a generally vertical axis adjacent said wheel, a rotatable brake support on said knuckle, a brake drum on said wheel rotatable therewith, friction means anchoring on said support and adapted to engage said drum, a flexible link secured at one end thereof to said frame at a point over said knuckle and on the axis of rotation of said knuckle and secured at its opposite end to said support at a point spaced laterally from the axis of rotation of the latter, and means connecting between said knuckle and said support yieldably resisting rotation of said support in a direction the reverse of that in which said link is taut in torque transmitting position.

9. A land vehicle having a body supporting frame and front and rear ground wheels, a brake drum on each wheel rotatable therewith and a rotatable brake support for each wheel respectively carrying friction means anchored thereto adapted to engage each drum, a flexible link connecting each brake support with said frame for limiting rotation of the brake supports in the direction of rotation of the drums and for transmitting the braking torque of each support to said frame, means connected with each link for yieldably holding each link taut when the said friction means on each support is out of engagement with each drum adapted to be engaged thereby, one of the ends of each link being secured to each support at a point spaced forwardly of the axis of rotation of the latter relative to the forward end of the vehicle, said frame being positioned above the said supports, and the opposite ends of said links being secured to said frame at points on the latter above said supports.

10. A land vehicle having a body supporting frame and front and rear ground wheels, a brake drum on each wheel rotatable therewith and a rotatable brake support for each wheel respectively carrying friction means anchored thereto adapted to engage each drum, a flexible link connecting each brake support with said frame for limiting rotation of the brake supports in the direction of rotation of the drums and for transmitting the braking torque of each support to said frame, means connected with each link for yieldably holding each link taut when the said friction means on each support is out of engagement with each drum adapted to be engaged thereby, one of the ends of each link being secured to each support at a point spaced forwardly of the axis of rotation of the latter relative to the forward end of the vehicle, said frame being positioned above the said supports, and the opposite ends of said links being secured to said frame at points on the latter above said supports, steering knuckles rotatable about generally vertically extending axes respectively supporting said front wheels for movement about said axes, and the links connected with the supports associated with the front wheels of said vehicle being secured at their said opposite ends to said frame at points on the upwardly extending axes of said steering knuckles whereby said links may swing about said latter points when said knuckles are pivoted on their axes.

11. A brake system for a body-supporting ground wheel of a vehicle in which said wheel includes an axle therefor, a backing plate, a brake drum, and a brake shoe carried by said plate for movement into and out of frictional engagement with said drum; means mounting said backing plate for revolvable movement about the wheel axis; a link connecting said backing plate with the body supported by said wheel for limiting said movement of said plate; a shock absorber spaced from said axle and said body having a spring-urged element connected with said link for yieldably holding said link under tension relative to said body; means carried by said axle independently of said body supporting said shock absorber against rotation about said axis and stationary relative to said axle.

12. A brake system for a body-supporting ground wheel of a vehicle in which said wheel includes an axle therefor, a backing plate, a brake drum, and a brake shoe carried by said plate for movement into and out of frictional engagement with said drum; means mounting said backing plate for revolvable movement about the wheel axis; a link connecting said backing plate with the body supported by said wheel for limiting said movement of said plate; a shock absorber carried by said axle stationary relative thereto having a movable spring urged element connected with said link for yieldably holding said link under tension relative to said body and which shock absorber includes means frictionally resisting movement of said element in a direction for releasing said tension on said link.

13. A brake system for a body-supporting ground wheel of a vehicle in which said wheel includes an axle therefor, a backing plate, a brake drum, and a brake shoe carried by said plate for movement into and out of frictional engagement with said drum; means mounting said backing plate for revolvable movement about the wheel axis; means connecting said plate with said body for limiting said movement; a shock absorber carried by said axle stationary relative thereto having an element connected with said body for movement generally vertically with said body upon up and down movement of said body on its springs relative to said axle; springs supporting said body on said axle for said movement of the body; and means yieldably urging said element downwardly for maintaining a yieldable downward force on said body; and hydraulic means in said shock absorber associated with said element for resisting upward movement of said element with a predetermined resistance while permitting such upward movement.

14. A brake system for a body-supporting ground wheel of a vehicle in which said wheel includes an axle therefor, a backing plate, a brake drum, a brake shoe carried by said plate for movement into and out of frictional engagement with said drum; means mounting said backing plate for revolvable movement about the wheel axis; a flexible link connecting said plate with said body for limiting said movement; a spring urged element carried by said axle independently of said body and spaced from the latter yieldably holding said link under tension; springs supporting said body on said axle for vertical up and down movement of said body and axle relative to each other; and means independent of said springs resisting movement of said axle and body in direction away from each other; said last mentioned means being carried on said axle at a point offset to one side of the latter.

15. In a vehicle, a frame, a resiliently suspended axle including a steering knuckle having a wheel-supporting spindle rotatable about a generally vertically extending axis, a rotatable brake support mounted on said spindle, friction means anchoring on said support and adapted to engage a brake drum, a wheel rotatable on said spindle having a brake drum secured thereto for rotation therewith and engageable by said friction means, a link connected at its ends to said support and to said spindle at points respectively forwardly of said spindle relative to the forward end of the vehicle and on said frame substantially on an upward extension of the generally vertically extending axis of said spindle, the said link being swingable about its point of securement with said frame.

16. In a vehicle, a frame, a resiliently suspended axle including a steering knuckle having a wheel-supporting spindle rotatable about a generally vertically extending axis, a rotatable brake support mounted on said spindle, friction means anchoring on said support and adapted to engage a brake drum, a wheel rotatable on said spindle having a brake drum secured thereto for rotation therewith and engageable by said friction means, a link connected at its ends to said support and to said spindle at points respectively forwardly of said spindle relative to the forward end of the vehicle and on said frame substantially on an upward extension of the generally vertically extending axis of said spindle, the said link being swingable about its point of securement with said frame, said support including an arm rigid therewith and projecting forwardly therefrom, the said link being secured at one of its said ends to the forward outer end of said arm, said link being flexible for flexing upon rotation of said support in a reverse direction to the normal forward direction of rotation of the drum when said friction means is in engagement with said drum and the latter is rotated in said reverse direction, means connected with said arm for yieldably resisting rotation of said support in said reverse direction, and a spring urged element connected with said arm for yieldably resisting said movement of said support in said reverse direction and yieldably urging said arm to a position holding said link taut when said friction means is out of engagement with said drum.

17. In a vehicle, a frame, a resiliently suspended axle, a rotatable brake support mounted on said axle, a rotary brake drum, friction means anchoring on said support and adapted to engage said drum, a cable, a member carried by said frame over said axle having a convexly curved upper and forwardly facing surface over which one end of said cable extends, means securing said one end of said cable to said member, the opposite end of said cable being secured to said support at a point spaced forwardly of said axle relative to the forward end of the vehicle for transmitting the braking torque of said support to said frame, said surface of said member being positioned relative to the said opposite end of said cable for guiding the end portion of the link over said surface during swinging of said cable when the latter is transmitting said torque to said frame, and the end of the link secured to said support being pivotally connected to the latter.

18. In a vehicle, a frame, a resiliently suspended axle housing, a rotatable power driven axle enclosed in said housing supporting a brake drum outwardly of one end of said housing for rotation therewith, a backing plate rotatable on said housing adjacent said drum, friction means anchoring on said support and adapted to engage said drum, a flexible, generally vertical link connected at its lower end to said backing plate at a point forwardly of said housing relative to the forward end of said vehicle and connected at its upper end to said frame, and a device secured to said axle housing having a spring urged member connected with said support adapted to yieldably urge said support in a direction for holding said link taut.

19. In a vehicle, a frame, a resiliently suspended axle housing, a rotatable power driven axle enclosed in said housing supporting a brake drum outwardly of one end of said housing for rotation therewith, a backing plate rotatable on said housing adjacent said drum, friction means anchoring on said support and adapted to engage said drum, a flexible, generally vertical link connected at its lower end to said backing plate at a point forwardly of said housing relative to the forward end of said vehicle and connected at its upper end to said frame, and a device secured to said axle housing having a spring urged member connected with said support adapted to yieldably urge said support in a direction for holding said link taut, means yieldably resistant to movement in one direction carried by said device and connected with said support for resisting movement of said support in a direction opposite to the direction in which said spring urged member is adapted to move said support.

20. In a vehicle having a ground wheel, a stationary axle housing supporting said wheel for rotation thereon and a frame sprung on said housing, a brake drum rigid with said wheel for rotation therewith, a brake support rotatable relative to said housing carrying friction means anchored thereto adapted to engage said drum, yieldable means interposed between said support and said frame for yieldably resisting rotation of said support in a direction opposite to the direction of rotation of said wheel when said vehicle is moving forwardly, and a means connecting directly with said support and with said frame and extending between them for limiting rotation of said support in the same direction as the direction of rotation of said wheel when said vehicle is moving forwardly, said last mentioned means being relatively flexible to permit movement of said frame and said support toward each other substantially free from detrimental strain on said link.

CHRISTIAN H. SAUER.